(12) United States Patent
Sato et al.

(10) Patent No.: US 12,280,716 B2
(45) Date of Patent: Apr. 22, 2025

(54) ATTENTION ATTRACTING SYSTEM AND ATTENTION ATTRACTING METHOD

(71) Applicant: HONDA MOTOR CO., LTD., Tokyo (JP)

(72) Inventors: Masayuki Sato, Wako (JP); Takahiro Matsuoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 68 days.

(21) Appl. No.: 18/466,896

(22) Filed: Sep. 14, 2023

(65) Prior Publication Data
US 2024/0101031 A1    Mar. 28, 2024

(30) Foreign Application Priority Data
Sep. 22, 2022   (JP) .................. 2022-151169

(51) Int. Cl.
 *B60Q 9/00* (2006.01)
 *B60R 22/34* (2006.01)

(52) U.S. Cl.
 CPC .............. *B60Q 9/008* (2013.01); *B60R 22/34* (2013.01)

(58) Field of Classification Search
 None
 See application file for complete search history.

(56) References Cited

U.S. PATENT DOCUMENTS

| | | | |
|---|---|---|---|
| 11,107,365 B1* | 8/2021 | Fields ................ | G08G 1/164 |
| 11,625,624 B2* | 4/2023 | Ariannezhad .... | G08G 1/096775 |
| | | | 340/425.5 |
| 2009/0160678 A1* | 6/2009 | Turnbull ............... | B60Q 1/547 |
| | | | 340/944 |
| 2015/0042491 A1* | 2/2015 | Burnison .............. | B60Q 9/008 |
| | | | 340/902 |
| 2016/0042238 A1* | 2/2016 | Lynam ................. | B60W 10/18 |
| | | | 701/45 |
| 2017/0032677 A1* | 2/2017 | Seo ...................... | B60Q 9/008 |
| 2017/0225614 A1 | 8/2017 | Park et al. | |
| 2019/0051185 A1* | 2/2019 | Masuda ................ | G08G 1/166 |
| 2021/0179094 A1* | 6/2021 | Newman .............. | B60W 10/20 |
| 2021/0403051 A1* | 12/2021 | Jaegal .............. | B60W 60/0059 |

FOREIGN PATENT DOCUMENTS

WO        2016/059724 A1    4/2016

* cited by examiner

*Primary Examiner* — Muhammad Adnan
(74) *Attorney, Agent, or Firm* — Rankin, Hill & Clark LLP

(57) ABSTRACT

An attention attracting system includes plural HMI devices notifying occupants; and an attention attracting device notifying the occupants of presence of a risk of contact between a subject vehicle and an object through the HMI devices. The attention attracting device includes a risk identification section identifying a risk level of the risk of the contact and a notification section: executing a first notification to notify a driver of the presence of the risk of the contact through a driver HMI device solely notifying the driver when the risk level exceeds a first threshold; and executing a second notification to notify a passenger of the presence of the risk of the contact through a passenger HMI device solely notifying the passenger when the risk level exceeds a second threshold greater than the first threshold or when a predetermined time passes after the first notification is executed.

6 Claims, 3 Drawing Sheets

ATTENTION ATTRACTING SYSTEM AND ATTENTION ATTRACTING METHOD

INCORPORATION BY REFERENCE

The present application claims priority under 35 U.S.C. § 119 to Japanese Patent Application No. 2022-151169 filed on Sep. 22, 2022. The content of the application is incorporated herein by reference in its entirety.

BACKGROUND OF THE INVENTION

Field of the Invention

The present invention relates to an attention attracting system and an attention attracting method that each attract the attention of an occupant in a vehicle.

Description of the Related Art

In recent years, more active efforts have been made to provide access to a sustainable transportation system that takes into consideration even people at vulnerable positions among traffic participants. To achieve this, efforts have been invested in research and development for still further improving traffic safety and convenience by researching and developing preventive safety technology.

International Publication No. WO 2016/059724 describes that, when warnings about a possibility of a collision between a subject vehicle and an object are output to both a driver and a passenger, a warning for the passenger is output at an earlier timing than the timing of a warning for the driver.

Incidentally, the preventive safety technology has a goal of notifying the driver of the presence of a risk of contact between the subject vehicle and a nearby object in a manner that, when the risk of the contact occurs, the driver does not feel any constraint or feel uncomfortable with the passenger in the driver's own driving and steering.

To achieve the goal described above, an object of this application is to transmit the risk of the contact between the subject vehicle and the nearby object to the driver in a manner that prevents the driver from feeling any constraint with the passenger and transmit the risk of the contact between the subject vehicle and the nearby object to the passenger in a manner that allows the passenger to feel reassured. This eventually contributes to the development of the sustainable transportation system.

SUMMARY OF THE INVENTION

An aspect of the present invention is an attention attracting system including: a plurality of HMI devices configured to notify a driver and a passenger other than the driver in a subject vehicle; and an attention attracting device configured to notify the driver and the passenger of presence of a possibility of contact between the subject vehicle and an object through the HMI devices. The attention attracting device includes a risk identification section configured to identify a risk level with respect to an object present in an environment surrounding the subject vehicle, and a notification section configured to notify the driver and the passenger of presence of a risk of the contact between the subject vehicle and the object through the HMI devices in accordance with the risk level. The risk level indicates a degree of the possibility of the contact occurring between the object and the subject vehicle. The plurality of HMI devices includes a driver HMI device and a passenger HMI device. The driver HMI device solely notifies the driver. The passenger HMI device solely notifies the passenger. The notification section executes a first notification to notify the driver of the presence of the risk of the contact through the driver HMI device when the risk level exceeds a first threshold, and a second notification to notify the passenger of the presence of the risk of the contact through the passenger HMI device when the risk level exceeds a second threshold or when a predetermined time passes after the first notification is executed. The second threshold is greater than the first threshold. The predetermined time being defined in advance.

According to another aspect of the present invention, the notification section executes a third notification to notify the driver and the passenger of the presence of the risk of the contact at a same time through the driver HMI device and the passenger HMI device when the risk level exceeds a third threshold greater than the first threshold and the second threshold.

According to another aspect of the present invention, notification intensity of the third notification is greater than notification intensities of the first notification and the second notification.

According to another aspect of the present invention, the driver HMI device and the passenger HMI device are electric seat belts. The electric seat belts are provided to a driver's seat and a seat other than the driver's seat in the subject vehicle. The electric seat belts each notify a person sitting in a corresponding seat by changing tension of a seat belt of the seat.

According to another aspect of the present invention, notification intensities of notifications executed for the driver and the passenger by the driver HMI device and the passenger HMI device are magnitudes of the tensions of the seat belts. The driver HMI device and the passenger HMI device are the electric seat belts.

Another aspect of the present invention is an attention attracting method that is performed by a computer of an attention attracting system. The attention attracting method includes: a risk identification step; and a notification step. In the risk identification step, a risk level with respect to an object present in an environment surrounding a subject vehicle is identified. The risk level indicates a degree of a possibility of contact occurring between the object and the subject vehicle. In the notification step, a driver and a passenger in the subject vehicle are notified of presence of a risk of the contact between the subject vehicle and the object through HMI devices in accordance with the risk level. The HMI devices are included in the subject vehicle. In the notification step, a first notification is executed to notify the driver of the presence of the risk of the contact through a driver HMI device when the risk level exceeds a first threshold, and a second notification is executed to notify the passenger of the presence of the risk of the contact through a passenger HMI device when the risk level exceeds a second threshold or when a predetermined time passes after the first notification is executed. The driver HMI device solely notifies the driver. The second threshold is greater than the first threshold. The predetermined time is defined in advance. The passenger HMI device solely notifies the passenger.

Advantageous Effects of Invention

According to an aspect of the present invention, it is possible to transmit a risk of contact between a subject vehicle and a nearby object to a driver in a manner that prevents the driver from feeling any constraint with a passenger and transmit the risk of the contact between the subject vehicle and the nearby object to the passenger in a manner that allows the passenger to feel reassured.

DETAILED DESCRIPTION OF THE PREFERRED EMBODIMENTS

The following describes embodiments of the present invention with reference to the drawings.

Figure 1:
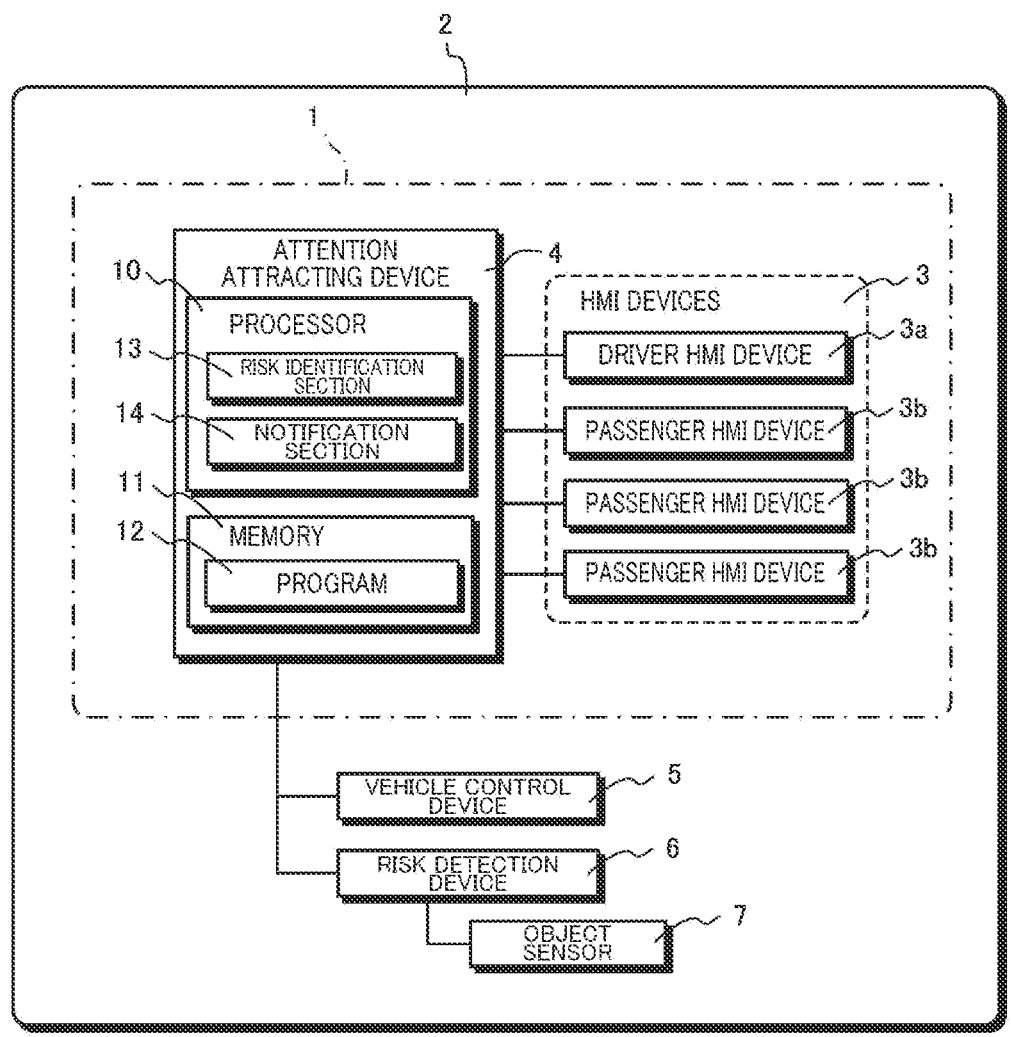
FIG. 1 is a diagram illustrating a configuration of an attention attracting system according to an embodiment of the present invention.
Figure 2:
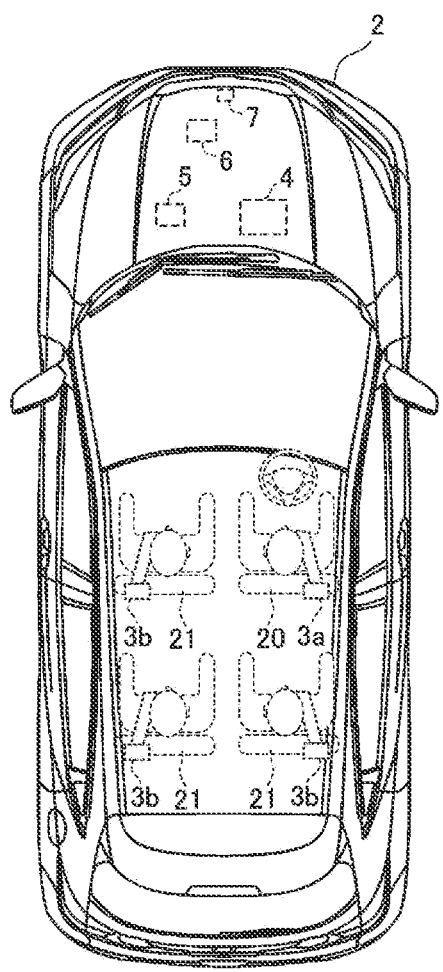
FIG. 2 is a diagram illustrating a configuration of a subject vehicle mounted with the attention attracting system.
Figure 3:
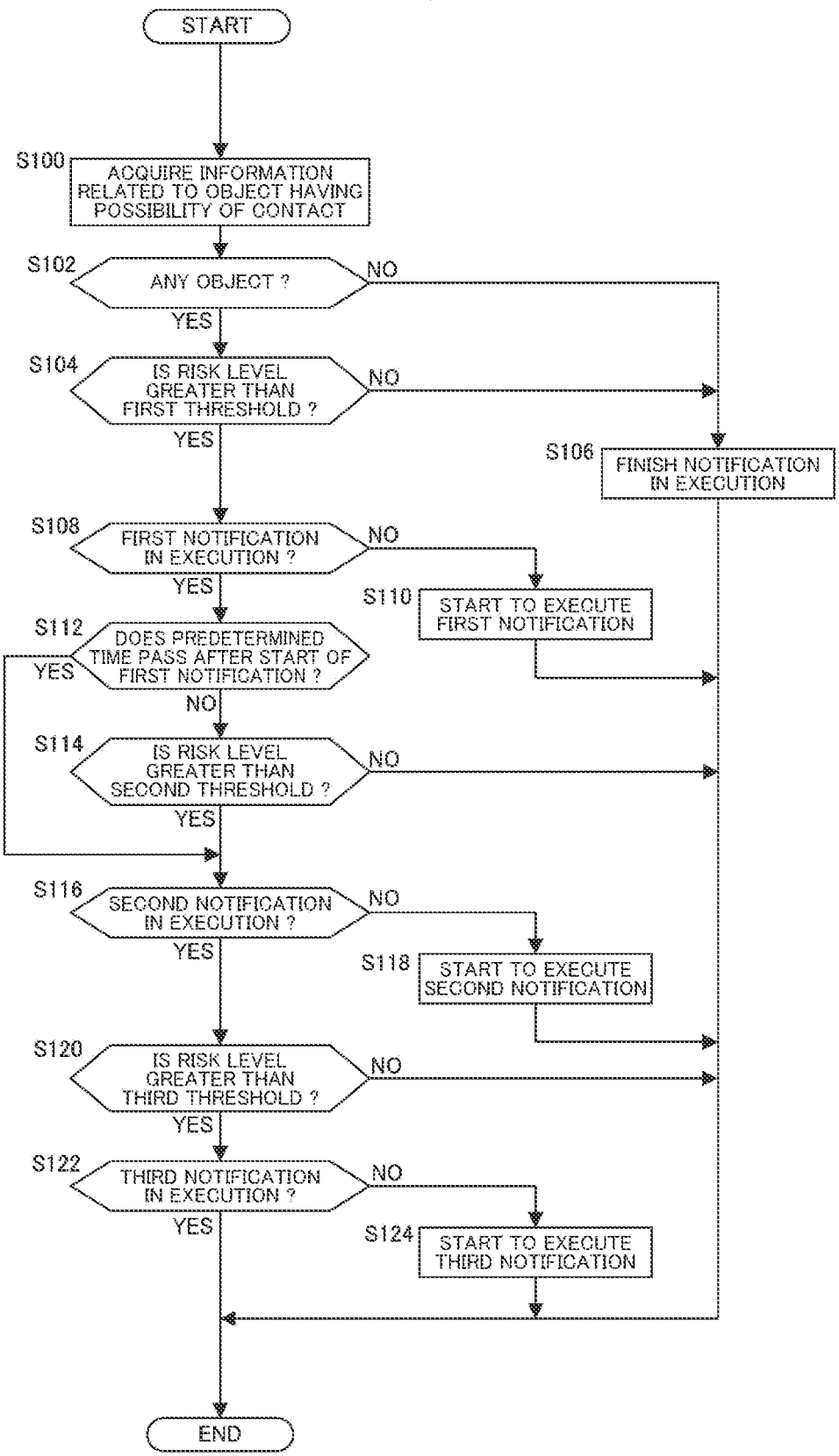
FIG. 3 is a flowchart illustrating a procedure of an attention attracting method that is executed by the attention attracting system.

FIG. 1 is a diagram illustrating a configuration of an attention attracting system 1 according to an embodiment of the present invention. In addition, FIG. 2 is a diagram illustrating a configuration of a subject vehicle 2 that is mounted with the attention attracting system 1 and FIG. 3 is a diagram illustrating a configuration of the vehicle compartment of the subject vehicle 2.

The attention attracting system 1 is mounted on the subject vehicle 2 to detect a possibility of contact (that will also be referred to as a "risk of contact" below) between the subject vehicle 2 and an object and notify a driver and a passenger of the subject vehicle 2 of the presence of the risk of the contact. Here, the "subject vehicle" means a vehicle mounted with the attention attracting system 1. In addition, the "passenger" refers to a person other than a driver in the subject vehicle 2. In addition, the following assumes that an "occupant" includes a driver and a passenger.

The attention attracting system 1 includes a plurality of HMI (Human-Machine Interface) devices 3 and an attention attracting device 4. The plurality of HMI devices 3 notifies a driver and a passenger in the subject vehicle 2. The attention attracting device 4 notifies the driver and the passenger of the presence of a risk of contact through the HMI devices 3. The HMI devices 3 include a driver HMI device 3a and one or more passenger HMI devices 3b. The driver HMI device 3a solely notifies a driver of the subject vehicle 2. The one or more passenger HMI devices 3b solely notify passengers.

In the present embodiment, the driver HMI device 3a is an electric seat belt that is provided to a driver's seat 20 of the subject vehicle 2 and notifies a driver by changing the tension of the seat belt of the driver's seat 20. In addition, the passenger HMI devices 3b are electric seat belts that are provided to three respective passenger seats 21 and notify passengers sitting in the passenger seats 21 by changing the tensions of the seat belts of the corresponding passenger seats 21. The passenger seats 21 are the seats other than the driver's seat 20.

The electric seat belts are, however, examples of the HMI devices 3. The HMI devices 3 may be any devices capable of separately notifying a driver and one or more passengers of the subject vehicle 2. For example, the HMI devices 3 may be directional LED lights or display devices that are provided in front of the respective passenger seats 21 and visible to only the respective passengers. Alternatively, the HMI devices 3 may be headrest speakers or seat speakers that are directional speakers which are provided to the respective seats and output sounds audible to only the respective occupants. Alternatively, the electric seat belts, the directional LED lights or the display devices, and/or the directional speakers each described above may be used in combination as the driver HMI device 3a and/or the passenger HMI devices 3b. Alternatively, the driver HMI device 3a may also be a vibration actuator, a massage seat, or the like. The vibration actuator provides vibration to the hands of a driver through a steering wheel 22. The massage seat is provided as the driver's seat 20 and/or the passenger seat 21 and provides a stimulus, for example, by patting, kneading, pressing, or vibrating a body part of a driver such as the back.

The subject vehicle 2 also includes a vehicle control device 5 (computer) that detects the operation state of a steering operation device such as the accelerator pedal, the brake pedal, the direction indicator lamps, or the steering wheel 22 of the subject vehicle 2 and detects a motion state such as the vehicle speed, the acceleration, or the yaw rate of the subject vehicle 2.

The subject vehicle 2 further includes an object sensor 7 and a risk detection device 6 (computer). The object sensor 7 is provided at the front of the vehicle body of the subject vehicle 2. The risk detection device 6 detects the presence of a risk of contact between the subject vehicle 2 and an object (including a traffic participant) in an environment surrounding the subject vehicle 2. The object sensor 7 may include, for example, one or more cameras, radars, lidars, and/or sonars distributed to the vehicle body of the subject vehicle 2.

The risk detection device 6 calculates a risk position and a risk level. The risk position is a position having a strong possibility of contact occurring between the subject vehicle 2 and an object. The risk level indicates the degree of the possibility of the contact occurring at the risk position. In the present embodiment, the risk detection device 6 uses a THW (Time to Headway) as a risk assessment index for assessing the risk level. The THW is obtained by dividing the inter-vehicle distance to a preceding vehicle traveling ahead of the subject vehicle 2 by the vehicle speed of the subject vehicle 2. The inter-vehicle distance described above may be calculated, for example, from a sensor output from the object sensor 7. The risk detection device 6 calculates the risk level as a function that monotonically increases, for example, along with a decrease in the THW. More specifically, the risk level may be provided as a function that monotonically increases, for example, in response to the inverse of the THW.

Instead of what has been described above, the risk detection device 6 may identify the risk position, for example, on the basis of a sensor output of the object sensor 7, positioning data, and map information and calculate the risk level at the risk position. The positioning data is acquired from a GPS apparatus (not illustrated). The risk position is a position having a strong possibility of contact occurring between the subject vehicle 2 and an object. The map information described above may include pieces of information related to road shapes such as an intersection, a straight road, and a curve, traffic infrastructure such as a traffic light, the disposition of a building, and the like.

The risk detection device 6 may predict the traffic lines of an object in a surrounding environment and the subject vehicle 2 on the basis of the position, the movement direction, and the speed of the object, the position, the movement direction, and the speed of the subject vehicle 2, the lighting state of a traffic light, and the like, for example, in accordance with traditional technology. The risk detection device 6 may then calculate the risk position and the risk level from the position at which the subject vehicle 2 and the object described above come the closest to each other and the distance between the subject vehicle 2 and the object described above at the position. According to the traditional technology, when the object is a vehicle, the risk detection device 6 may take into consideration the lighting states of the direction indicator lamps and the brake lamps of the vehicle to predict the traffic line of the object. When the object is a pedestrian, the risk detection device 6 may take into consideration the orientation of the face of the pedestrian and the like to predict the traffic line of the object. Similarly, to predict the traffic line of the subject vehicle 2, the risk detection device 6 may take into consideration the lighting states of the direction indicator lamps and the brake lamps of the subject vehicle 2 acquired from the vehicle control device 5. If a navigation device (not illustrated) is guiding a route, the risk detection device 6 may take into consideration the route that is being guided.

In addition, the risk detection device 6 does not only detect a risk of contact between the subject vehicle 2 and an object that is actually detected in an environment surrounding the subject vehicle 2, but may also infer and detect a risk of contact with an object (such as a virtual vehicle or pedestrian) that has not yet been detected, but can appear on the basis of even information related to a possibility of contact acquired from the others (e.g., another vehicle) through a vehicle communication network including so-called V2X communication and the like and/or on the basis of visibility, the number of accidents, and the like at an intersection or the like.

The attention attracting device 4 includes a processor 10 and a memory 11. The memory 11 includes, for example, a volatile and/or non-volatile semiconductor memory, a hard disk device, and/or the like. The processor 10 is, for example, a computer including a CPU and the like. The processor 10 may include a ROM in which a program is written, an RAM for temporarily storing data, and the like. The processor 10 then includes a risk identification section 13 and a notification section 14 as functional elements or functional units.

These functional elements included in the processor 10 are implemented by the processor 10 executing a program 12 stored in the memory 11. The processor 10 is, for example, a computer. It is to be noted that it is possible to store the program 12 in any computer-readable storage medium. Instead of this, it is also possible to configure all or some of the above-described functional elements included in the processor 10 by using hardware including one or more electronic circuit parts.

The risk identification section 13 identifies risk levels at predetermined time intervals. The risk levels each indicate the degree of a possibility of contact occurring between the subject vehicle 2 and an object present in an environment surrounding the subject vehicle 2. In the present embodiment, the risk identification section 13 acquires a result of the calculation of the risk level from the risk detection device 6 and identifies the current risk level.

The notification section 14 notifies a driver and a passenger of the presence of a risk of contact between the subject vehicle 2 and the object through the HMI devices 3 in accordance with the current risk level identified by the risk identification section 13.

In the present embodiment, the notification section 14 in particular executes a first notification to notify the driver of the presence of the risk of the contact through the driver HMI device 3*a* when the risk level exceeds a first threshold. In addition, the notification section 14 executes a second notification to notify the passenger of the presence of the risk of the contact through the passenger HMI device 3*b* when the risk level exceeds a second threshold indicating a higher risk level than the risk level indicated by the first threshold or when a predetermined time defined in advance passes after the first notification is executed.

The attention attracting system 1 does not thus notify the passenger, but notifies only the driver at the time when the risk of the contact between the subject vehicle 2 and the object occurs. This allows the driver to concentrate on initial steering to evade danger without feeling any constraint with the passenger. In contrast, the passenger is notified when the risk level increases or when a predetermined time passes after the occurrence of the risk of the contact. This allows the passenger to take various countermeasures such as preparing for a change (e.g., vehicle body roll) in acceleration that can be made by emergency steering in an unexpected situation or prompting the driver to pay attention. It is thus possible to make the passenger feel reassured.

The notification section 14 also executes a third notification to notify the driver and the passenger of the presence of the risk of the contact at the same time through the driver HMI device 3*a* and the passenger HMI device 3*b* when the risk level exceeds a third threshold greater than the first threshold and the second threshold.

This makes it possible to prompt all the occupants to each take necessary countermeasures with no delay because the driver and the passenger are notified at the same time when the risk level further increases and the possibility of the necessity of emergency steering becomes stronger.

It is preferable that the notification manner of the third notification described above be different from the notification manners of the first notification and the second notification. For example, the notification intensity of the third notification may be different from the notification intensities of the first notification and the second notification. This makes it possible to clearly notify the occupants of the subject vehicle 2 that a high-risk situation has come whose risk level exceeds the third threshold greater than the first threshold and the second threshold.

In the present embodiment, the notification intensities of notifications executed for the driver and the passenger by the driver HMI device 3*a* and the passenger HMI device 3*b* that are the electric seat belts are the magnitudes of the tensions of the respective seat belts.

Since electric seat belts are used as the driver HMI device 3*a* and the passenger HMI device 3*b*, this makes it possible to individually transmit a risk of contact to the occupants by providing tactile stimuli to the respective occupants from the seat belts of the respective seats without adding any equipment special to the occupants. In addition, the configuration described above allows the driver and the passenger to recognize the increased risk level in a realistic manner through the intensities of the tactile stimuli received from the respective seat belts.

Next, a procedure of an operation in the attention attracting system 1 will be described.

FIG. 3 is a flowchart illustrating a procedure of processing in an attention attracting method. The processing is executed by the processor 10 that is a computer of the attention attracting device 4 included in the attention attracting system 1. This processing is repeatedly executed at predetermined time intervals.

Once the processing starts, the risk identification section 13 first acquires, from the risk detection device 6, information indicating whether or not an environment surrounding the subject vehicle 2 has an object (that will be referred to as an "object having a possibility of contact" below) having a possibility of coming into contact with the subject vehicle 2 and information related to a risk level with respect to the object having the possibility of the contact (S100). As described above, the processing illustrated in FIG. 3 is repeatedly executed at the predetermined time intervals. The risk identification section 13 thus repeatedly acquires the presence or absence of the object having the possibility of the contact and the risk levels with respect to the object at the predetermined time intervals in step S100. Here, step S100 corresponds to a risk identification step in the present disclosure. In addition, steps S102 to S124 described below correspond to a notification step in the present disclosure.

Next, the notification section 14 determines whether or not the object having the possibility of the contact is present in the surrounding environment on the basis of the information acquired by the risk identification section 13 from the risk detection device 6 (S102). When the object having the possibility of coming into contact with the subject vehicle 2 is not present (NO in S102), the notification section 14 then finishes the first notification, the second notification, or the third notification (S106) to finish this processing if any of these notifications is issued.

In contrast, when the object having the possibility of coming into contact with the subject vehicle 2 is present in the surrounding environment (YES in S102), the notification section 14 determines whether or not the risk level is greater than the first threshold (S104). When the risk level is less than or equal to the first threshold (NO in S104), the notification section 14 then brings the processing to step S106.

In contrast, when the risk level exceeds the first threshold (YES in S104), the notification section 14 determines whether or not the first notification is in execution (S108). When the first notification is not in execution (NO in S108), the notification section 14 then starts to execute the first notification (S110) to finish this processing. As described above, the first notification is a notification executed for a driver by the driver HMI device 3a to notify the driver of the presence of a risk of contact between the subject vehicle 2 and an object.

In contrast, when the first notification is in execution (YES in S108), the notification section 14 determines whether or not a predetermine time passes from the start of the execution of the first notification (S112). When the predetermined time passes from the start of the execution of the first notification (YES in S112), the notification section 14 then brings the processing to step S116. In contrast, when the predetermined time does not pass from the start of the execution of the first notification (NO in S112), the notification section 14 determines whether or not the risk level is greater than the second threshold (S114). When the risk level is less than or equal to the second threshold (NO in S114), the notification section 14 then finishes this processing.

In contrast, when the risk level is greater than the second threshold (YES in S114), the notification section 14 determines whether or not the second notification is in execution (S116). When the second notification is not in execution (NO in S116), the notification section 14 then starts to execute the second notification (S118) to finish this processing. The second notification is thus started if the second notification is not in execution when the predetermined time passes from the start of the execution of the first notification or when the risk level exceeds the second threshold before the predetermined time passes. It is to be noted that the second notification is a notification executed for a passenger by the passenger HMI device 3b to notify the passenger of the presence of a risk of contact as described above.

In contrast, when the second notification is in execution in step S116 (YES in S116), the notification section 14 determines whether or not the risk level is greater than the third threshold (S120). When the risk level is less than or equal to the third threshold (NO in S120), the notification section 14 then finishes this processing. In contrast, when the risk level is greater than the third threshold (YES in S120), the notification section 14 determines whether or not the third notification is in execution (S122).

When the third notification is not in execution (NO in S122), the notification section 14 then starts to execute the third notification (S124) to finish this processing. In contrast, when the third notification is in execution (YES in S122), the notification section 14 finishes this processing as it is.

[Another Embodiment]

In the embodiment described above, the inverse of the THW with respect to a preceding vehicle is used as an example of the risk level, but it is possible to consider the risk level as any parameter indicating the degree of a risk of contact between the subject vehicle 2 and an object. In addition, a risk assessment index such as a THW may be used as it is instead of the risk level. Depending on a risk assessment index, a decrease in the value of the risk assessment index can, however, correspond to an increase in the risk level. In such a case, it is sufficient if it is determined whether or not the risk assessment index falls below a value corresponding to the first threshold, the second threshold, or the third threshold described above instead of determining whether or not the risk level exceeds the first threshold, the second threshold, or the third threshold.

For example, the THW has a smaller value and a possibility of contact between the preceding vehicle and the subject vehicle 2 becomes stronger as the inter-vehicle distance decreases or the vehicle speed of the subject vehicle 2 increases. A decrease in the value of the THW thus corresponds to an increase in the risk level. Thus, when the THW is used instead of the risk level, it is possible to execute the first notification, the second notification, or the third notification described above by determining whether or not the THW falls below the value corresponding to the first threshold, the second threshold, or the third threshold described above.

In addition, in the embodiment described above, the passenger HMI device 3b outputs a notification to a passenger at a timing later than the timing of a notification output to a driver by the driver HMI device 3a. It is, however, possible to further cause the passenger HMI devices 3b to output notifications at different timings.

For example, when the second notification described above is executed, the passenger HMI device 3b provided to a front seat (i.e., the passenger seat 21 disposed next to the driver's seat 20) may first output a notification to an occupant in the front seat and the passenger HMI device 3b of a seat (e.g., back seat) other than the front seat may then output a notification to the corresponding occupant after a predetermined time passes. This causes the notification to be first output to the occupant in the front seat who visually recognize a view ahead of the subject vehicle 2 with ease among the passengers after the notification to the driver. It is thus possible for the occupant in the front seat to quickly advise the driver and support the driver.

It is to be noted that the present invention is not limited to the configurations in the embodiments described above, but it is possible to carry out the present invention in a variety of aspects within the scope that does not depart from the gist of the present invention.

[Configurations Supported by Embodiments Above]

The embodiments described above support the following configurations.

(Configuration 1) An attention attracting system including:
- a plurality of HMI devices configured to notify a driver and a passenger other than the driver in a subject vehicle; and
- an attention attracting device configured to notify the driver and the passenger of presence of a possibility of contact between the subject vehicle and an object through the HMI devices, in which
- the attention attracting device includes
  - a risk identification section configured to identify a risk level with respect to an object present in an environment surrounding the subject vehicle, the risk level indicating a degree of the possibility of the contact occurring between the object and the subject vehicle, and
  - a notification section configured to notify the driver and the passenger of presence of a risk of the contact between the subject vehicle and the object through the HMI devices in accordance with the risk level,
- the plurality of HMI devices includes a driver HMI device and a passenger HMI device, the driver HMI device solely notifying the driver, the passenger HMI device solely notifying the passenger, and
- the notification section executes
  - a first notification to notify the driver of the presence of the risk of the contact through the driver HMI device when the risk level exceeds a first threshold, and
  - a second notification to notify the passenger of the presence of the risk of the contact through the passenger HMI device when the risk level exceeds a second threshold or when a predetermined time passes after the first notification is executed, the second threshold being greater than the first threshold, the predetermined time being defined in advance.

The attention attracting system according to Configuration 1 does not notify the passenger, but notifies only the driver at the time when the risk of the contact between the subject vehicle and the object occurs. This allows the driver to concentrate on initial steering to evade danger without feeling any constraint with the passenger. In contrast, the passenger is notified when the risk level increases or when a predetermined time passes after the occurrence of the risk of the contact. This allows the passenger to take various countermeasures such as preparing for a change in acceleration that can be made by emergency steering in an unexpected situation or prompting the driver to pay attention. It is thus possible to make the passenger feel reassured.

(Configuration 2) The attention attracting system according to Configuration 1, in which the notification section executes a third notification to notify the driver and the passenger of the presence of the risk of the contact at a same time through the driver HMI device and the passenger HMI device when the risk level exceeds a third threshold greater than the first threshold and the second threshold.

The attention attracting system according to Configuration 2 makes it possible to prompt all the occupants to each take necessary countermeasures with no delay because the driver and the passenger are notified at the same time when the risk level further increases and the possibility of the necessity of emergency steering becomes stronger.

(Configuration 3) The attention attracting system according to Configuration 2, in which notification intensity of the third notification is greater than notification intensities of the first notification and the second notification.

The attention attracting system according to Configuration 3 makes it possible to clearly notify the occupants of the subject vehicle that a high-risk situation has come whose risk level exceeds the third threshold greater than the first threshold and the second threshold.

(Configuration 4) The attention attracting system according to any of Configurations 1 to 3, in which the driver HMI device and the passenger HMI device are electric seat belts, the electric seat belts being provided to a driver's seat and a seat other than the driver's seat in the subject vehicle, the electric seat belts each notifying a person sitting in a corresponding seat by changing tension of a seat belt of the seat.

The attention attracting system according to Configuration 4 makes it possible to receive a notification about the risk of the contact through a tactile stimulus from the seat belt without adding any equipment special to the driver and the passenger.

(Configuration 5) The attention attracting system according to Configuration 4, in which notification intensities of notifications executed for the driver and the passenger by the driver HMI device and the passenger HMI device are magnitudes of the tensions of the seat belts, the driver HMI device and the passenger HMI device being the electric seat belts.

The attention attracting system according to Configuration 5 allows the driver and the passenger to recognize the increased risk level in a realistic manner through the intensities of the tactile stimuli received from the seat belts.

(Configuration 6) An attention attracting method that is performed by a computer of an attention attracting system, the attention attracting method including:
- a risk identification step of identifying a risk level with respect to an object present in an environment surrounding a subject vehicle, the risk level indicating a degree of a possibility of contact occurring between the object and the subject vehicle; and
- a notification step of notifying a driver and a passenger in the subject vehicle of presence of a risk of the contact between the subject vehicle and the object through HMI devices in accordance with the risk level, the HMI devices being included in the subject vehicle, in which
- in the notification step,
  - a first notification is executed to notify the driver of the presence of the risk of the contact through a driver HMI device when the risk level exceeds a first threshold, the driver HMI device solely notifying the driver, and
  - a second notification is executed to notify the passenger of the presence of the risk of the contact through a passenger HMI device when the risk level exceeds a second threshold or when a predetermined time passes after the first notification is executed, the second threshold being greater than the first threshold, the predetermined time being defined in advance, the passenger HMI device solely notifying the passenger.

In the attention attracting system according to Configuration 6, the passenger is not notified, but only the driver is notified at the time when the risk of the contact with the object around the subject vehicle occurs. This allows the driver to concentrate on initial steering to evade danger without feeling any constraint with the passenger. In contrast, the passenger is notified when the risk level increases or when a predetermined time passes after the occurrence of the risk of the contact. This allows the passenger to take various countermeasures such as preparing for a change in acceleration that can be made by emergency steering in an unexpected situation or prompting the driver to pay attention. It is thus possible to make the passenger feel reassured.

REFERENCE SIGNS LIST 1 attention attracting system
2 subject vehicle
3 HMI device
3a driver HMI device
3b passenger HMI device
4 attention attracting device
5 vehicle control device
6 risk detection device
7 object sensor
10 processor
11 memory
12 program
13 risk identification section
14 notification section
20 driver's seat
21 passenger seat

What is claimed is:

1. An attention attracting system comprising:
a plurality of HMI devices configured to notify a driver and a passenger other than the driver in a subject vehicle; and
an attention attracting device configured to notify the driver and the passenger of presence of a possibility of contact between the subject vehicle and an object through the HMI devices, wherein
the attention attracting device includes
a risk identification section configured to identify a risk level with respect to an object present in an environment surrounding the subject vehicle, the risk level indicating a degree of the possibility of the contact occurring between the object and the subject vehicle, and
a notification section configured to notify the driver and the passenger of presence of a risk of the contact between the subject vehicle and the object through the HMI devices in accordance with the risk level,
the plurality of HMI devices includes a driver HMI device and a passenger HMI device, the driver HMI device solely notifying the driver, the passenger HMI device solely notifying the passenger, and
the notification section executes
a first notification to notify the driver of the presence of the risk of the contact through the driver HMI device when the risk level exceeds a first threshold, and
a second notification to notify the passenger of the presence of the risk of the contact through the passenger HMI device when the risk level exceeds a second threshold or when a predetermined time passes after the first notification is executed, the second threshold being greater than the first threshold, the predetermined time being defined in advance.

2. The attention attracting system according to claim 1, wherein the notification section executes a third notification to notify the driver and the passenger of the presence of the risk of the contact at a same time through the driver HMI device and the passenger HMI device when the risk level exceeds a third threshold greater than the first threshold and the second threshold.

3. The attention attracting system according to claim 2, wherein notification intensity of the third notification is greater than notification intensities of the first notification and the second notification.

4. The attention attracting system according to claim 1, wherein the driver HMI device and the passenger HMI device are electric seat belts, the electric seat belts being provided to a driver's seat and a seat other than the driver's seat in the subject vehicle, the electric seat belts each notifying a person sitting in a corresponding seat by changing tension of a seat belt of the seat.

5. The attention attracting system according to claim 4, wherein notification intensities of notifications executed for the driver and the passenger by the driver HMI device and the passenger HMI device are magnitudes of the tensions of the seat belts, the driver HMI device and the passenger HMI device being the electric seat belts.

6. An attention attracting method that is performed by a computer of an attention attracting system, the attention attracting method comprising:
a risk identification step of identifying a risk level with respect to an object present in an environment surrounding a subject vehicle, the risk level indicating a degree of a possibility of contact occurring between the object and the subject vehicle; and
a notification step of notifying a driver and a passenger in the subject vehicle of presence of a risk of the contact between the subject vehicle and the object through HMI devices in accordance with the risk level, the HMI devices being included in the subject vehicle, wherein
in the notification step,
a first notification is executed to notify the driver of the presence of the risk of the contact through a driver HMI device when the risk level exceeds a first threshold, the driver HMI device solely notifying the driver, and
a second notification is executed to notify the passenger of the presence of the risk of the contact through a passenger HMI device when the risk level exceeds a second threshold or when a predetermined time passes after the first notification is executed, the second threshold being greater than the first threshold, the predetermined time being defined in advance, the passenger HMI device solely notifying the passenger.

* * * * *